3,767,603
METHOD FOR PREPARING SYNTHETIC RESIN COMPOSITIONS FROM VINYL MONOMERS
Shunichi Koyanagi and Kinya Ogawa, Yokohama, and Yoshiro Onda, Naoetsu, Japan, assignors to Shinetsu Chemical Company, Tokyo, Japan
No Drawing. Filed Aug. 30, 1971, Ser. No. 176,330
Claims priority, application Japan, Sept. 1, 1970, 45/76,820
Int. Cl. C08d 1/09; C08f 1/13
U.S. Cl. 260—17 A         6 Claims

ABSTRACT OF THE DISCLOSURE

Hydroxybutylhydroxyethyl cellulose is employed as an emulsifier in the emulsion polymerization of vinyl monomer, to produce synthetic resin emulsions. The emulsions thus obtained possess superior stability especially against any pigments and salts that are usually present therein. They are effective as paints, adhesives, textile-finishing agents, etc.

BACKGROUND OF THE INVENTION

This invention relates to a method for preparing synthetic resin emulsions superior in stability.

Various synthetic resin emulsions are widely used as paints, adhesives, or textile finishing agents. In preparing these emulsions, the emulsion-polymerizing method is generally adopted in which is employed, as an emulsifier, polyvinyl alcohol (hereinafter referred to as PVA), cellulose ether, such as methyl cellulose (MC), hydroxyethyl cellulose (HEC), or a nonionic surface active agent such as ethylene oxide-propylene oxide block copolymer (EO-PO copolymer). But if PVA is employed as an emulsifier in emulsion-polymerization, for example, of acrylic acid, styrene, vinyl acetate or vinyl chloride, the polymerization will not proceed smoothly, so that a stable emulsion can hardly be prepared. Especially, the emulsion obtained by polymerizing vinyl acetate is inferior in stability when mixed with salts or pigments. The use of MC or EO-PO copolymer, as an emulsifier will also bring about the disadvantages like the ones observed in the use of PVA. When HEC is employed as an emulsifier, the emulsion polymerization will proceed comparatively smoothly, but the emulsion prepared will be inferior in stability when mixed with pigments.

STATEMENT OF THE INVENTION

An object of the invention is to provide a method for preparing synthetic resin emulsions free from the above-given disadvantages, which is characterized by employing hydroxybutylhydroxyethyl cellulose (HBHEC) as an emulsifier in preparing synthetic resin emulsions by the polymerization.

To give a more detailed description of the invention, it is based on our observations that if HBHEC is employed as an emulsifier in the production of various synthetic resin emulsions, the emulsion polymeriztion will proceed very smoothly, and that the emulsions prepared will exhibit, besides increased viscosity, superior stability when mixed either with salts or pigments. It is not very clear why the employment of HBHEC as an emulsifier gives the product such superior properties, but it is perhaps because HBHEC has a unique characteristic of being soluble in organic solvents such as methanol and ethanol, although it is soluble in water, just like HEC is.

As mentitoned above, HBHEC employed in the present invention is soluble both in water and organic solvents, and it is prepared by the known method of reacting, for example, alkali cellulose with ethylene oxide and butylene oxide, and its compatibility with salts, its solubility in water, as well as in organic solvents, and the gel point of its solution can be varied severally by varying the amounts of substitution radicals such as hydroxybutyl radicals and hydroxyethyl radicals. HBHEC employed in the present invention is represented by the structure given below.

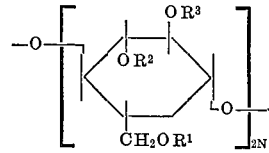

(where $R^1$, $R^2$, and $R^3$ are each selected from the group consisting of (1) hydrogen atom, (2) hydroxyethyl radical, (3) hydroxybutyl radical, and (4) hydroxyethyl radical or hydroxybutyl radical, the oxygen atom of whose hydroxyl radical is bonded with one or more hydroxyethyl or hydroxybutyl radicals by dehydrogenation, and where (i) at least one of the R's is hydroxyethyl radical and another one is hydroxybutyl radical, or (ii) at least one of the R's is hydroxyethyl radical or hydroxybutyl radical, the oxygen atom of whose hydroxyl group is bonded with one hydroxybutyl or hydroxyethyl radical by dehydrogenation, and where $n$ is an integer) and what is especially desired of it, although never required of it, is that the average mole number of the bonded hydroxyalkyl radicals per anhydrous glucose unit in the cellulose (hereinafter referred to as M.S.) is from 0.1 to 2.0, or more preferably from 0.2 to 1.5 in the case of hydroxybutyl radical, and from 1.0 to 3.0, or more preferably from 1.5 to 2.5 in the case of hydroxyethyl radical, and that the viscosty of a 2% aqueous solution of it at 25° C. is from 10 to 30,000 cps.

The method of the invention can be carried out in accordance with the known method for the emulsion polymerization, provided HBHEC is employed in it as an emulsifier. The amount of HBHEC employed as an emulsifier is generally from 0.1 to 20 parts by weight based on 100 parts by weight of a monomer to be emulsion polymerized, but the amount may be increased or decreased, depending on the use to which the emulsion prepared is to be put. Other known emulsifiers may be used together with HBHEC, but their amounts must be small enough not to reduce the effects of HBHEC.

By the method of the invention may be emulsion polymerized any kind of monomer, such as vinyl acetaate, vinyl chloride, vinylidene chloride, styrene, acrylic ester, methacrylic ester, butadiene or chloroprene, either alone or in the plural number.

In the following examples, parts and percentages are all given by weight.

Example 1

Into a reactor were put 47 parts of vinyl acetate, 50 parts of water, 0.1 part of hydrogen peroxide, 0.1 part of tartaric acid, and 2.8 parts of HBHEC (M.S. of hydroxybutyl radical: 0.5; M.S. of hydroxyethyl radical: 1.5; viscosity of a 2% aqueous solution: 8,000 cps.), and the mixture was subjected to the emulsion polymerization at 85° C. for 5 hours. The polymerization reaction proceeded smoothly, giving an emulsion which contained about 50% solid matter, and whose viscosity was 30,000 cps. To 50 parts of this emulsion were added 25 parts of aluminum sulfate and 25 parts of water, and the composition obtained had a viscosity of 15,000 cps., and it remained stable at room temperature for more than 3 months.

As a control, a similar experiment was conducted in which HBHEC was replaced by MC (D.S. of methoxy radical: 1.8; and viscosity of a 2% aqueous solution: 8,000 cps.), and the emulsion obtained had a viscosity as low as 4,000 cps., and it got separated in 24 hours, giving a precipitate.

Example 2

40 parts of vinyl acetate, 57 parts of water, and 1 part of HBHEC (M.S. of hydroxyethyl radical: 2.0; M.S. of hydroxybutyl radical: 0.5; viscosity of a 2% aqueous solution: 12,000 cps.), 1 part of sodium carbonate, and 1 part of ammonium peroxysulfate were put into a reactor, and were subjected to the emulsion polymerization at 85° C. for 4 hours. The polymerization reaction proceeded smoothly, giving an emulsion. To 50 parts of the emulsion were added 50 parts of titanium dioxide, and the mixture remained stable at room temperature for more than 3 months.

As a control, a similar experiment was conducted in which HBHEC was replaced by HEC (M.S. of hydroxyethyl radical: 2.0; viscosity of a 2% aqueous solution: 12,000 cps.), and to the emulsion given by the emulsion polymerization was added titanium dioxide. The mixture thus prepared got separated in 10 days, precipitating granular solid matter.

Example 3

50 parts of vinyl acetate, 45 parts of water, 3 parts of HBHEC (M.S. of hydroxyethyl radical: 2.0; M.S. of hydroxybutyl radical: 0.7; viscosity of a 2% aqueous solution: 1,000 cps.), 1 part of cetyl alcohol, 0.5 part of sodium carbonate, and 0.5 part of potassium persulfate were put into a reactor, and were subjected to the emulsion polymerization at 90° C. for 3 hours. The polymerization reaction proceeded smoothly and the emulsion prepared had a viscosity of 3,500 cps. To 50 parts of the emulsion were added 50 parts of titanium dioxide, and the mixture remained stable at room temperature for more than 3 months.

As a control, a similar experiment was conducted in which HBHEC was replaced by PVA (saponification degree: 88 mole percent; viscosity of 4% aqueous solution: 45 cps.). The emulsion obtained had a viscosity of only 200 cps., and the mixture prepared by adding titanium oxide to the emulsion got separated in a few hours, giving a precipitate.

Example 4

40 parts of vinyl acetate, 10 parts of ethyl acrylate, 45 parts of water, 2 parts of HBHEC (M.S. of hydroxyethyl radical: 2.5; M.S. of hydroxybutyl radical: 0.9; viscosity of a 2% aqueous solution: 4,000 cps.), 1 part of potassium persulfate and 2 parts of sodium carbonate were put into a reactor and were subjected to the emulsion polymerization at 70° C. for 3 hours. The polymerization reaction proceeded smoothly and the emulsion obtained exhibited an extremely high stability (stable for more than 3 months). Said emulsion exhibited a superior coatability, and was compatible with pigments and salts, so that it served as an excellent material for a paint which would form an incombustible film.

As a control, a similar experiment was conducted in which HBHEC was replaced by HEMC (D.S. of methoxy radical: 1.5; M.S. of hydroxyethyl radical: 0.2), obtaining an emulsion. To both the emulsions was added iron oxide black, and the stability in storage, brush-coatability, and incombustibility of both the mixtures were studied. The results obtained were as follows.

|  | Present invention | Control |
|---|---|---|
| Stability in storage | Stable even after the lapse of 3 months. | Got separated in 2 weeks. |
| Brush-coatability | Good | Bad. |
| Incombustibility | do | Good. |

Example 5

10 parts of titanium dioxide, 35 parts of water, and 5 parts of HBHEC (M.S. of hydroxybutyl radical: 1.0; M.S. of hydroxyethyl radical: 1.8; viscosity of a 2% aqueous solution: 50 cps.) were well mixed by shaking in a vibrating mill, and the mixture was put in a reactor together with 0.5 part of hydrogen peroxide and 50 parts of methyl acrylate, and were subjected to the emulsion polymerization at 90° C. for 2 hours. The emulsion obtained proved to be an excellent material for a paint, and exhibited superior stability in storage (for more than 3 months).

As a control, a similar experiment was conducted in which HBHEC was replaced by CMC (viscosity of a 2% aqueous solution: 50 cps.), obtaining an emulsion.

To both the emulsions were added titanium white (Rutile-type) and talc, and the stability in storage, brush-coatability and non-adhesiveness of the two mixtures were studied, obtaining the results given below.

|  | Present invention | Control |
|---|---|---|
| Stability in storage | Stable even after the lapse of 3 months. | Got separated in 1 week, giving a precipitate. |
| Brush-coatability | Good | Bad. |
| Non-adhesiveness | do | Bad. |

Example 6

35 parts of chloroprene, 60 parts of water, 2 parts of HBHEC (M.S. of hydroxyethyl radical: 2.5; M.S. of hydroxybutyl radical: 1.0; and viscosity of a 2% aqueous solution: 50 cps.), 1 part of naphthalene sodium sulfonate, 1 part of potassium persulfate and 1 part of sulfur were put into a reactor, and were subjected to the emulsion polymerization at 35° C. for 16 hours, in order to give an emulsion.

As a control, a similar experiment was conducted in which HBHEC was replaced by HPMC (D.S. of methoxy radical: 1.8; M.S. of hydroxypropoxyl radical: 0.2) to give another emulsion. The stability in storage of both the emulsions were studied together with the adhesiveness to and coatability over metal plates of the mixtures of each of them and zinc oxide, carbon black and clay. The results obtained were as follows.

|  | Present invention | Control |
|---|---|---|
| Stability in storage | Stable after the lapse of 3 months. | Got separated in a week. |
| Stability in storage (70° C.). | Stable after the lapse of 1 month. | Got separated in 24 hours. |
| Adhesion of the film formed. | Good | Good. |
| Condition of the film formed. | do | Bad. |

What is claimed is:

1. A method for preparing a synthetic resin emulsion by emulsion polymerization which comprises polymerizing a vinyl monomer selected from the group consisting of vinyl acetate, vinyl chloride, vinylidene chloride, styrene, lower alkyl esters of acrylic acid, lower alkyl esters of methacrylic acid, butadiene, chloroprene, and mixtures thereof in the presence of hydroxybutylhydroxyethyl cellulose as an emulsifier in an amount of from 0.1 to 20 parts by weight based on 100 parts by weight of said vinyl monomer, said hydroxybutylhydroxyethyl cellulose having an average mole number of hydroxyalkyl groups per anhydrous glucose unit in the cellulose of from 0.1 to 2.0 for the hydroxybutyl radicals and 1.0 to 3.0 for the hydroxyethyl radicals, and a viscosity of from 10 to 30,000 cps. at 25° C. in a 2 percent aqueous solution, and a free-radical polymerization catalyst.

2. The method of claim 1 wherein the monomer is vinyl acetate.

3. The method claimed in claim 1, wherein said hydroxybutylhydroxyethyl cellulose has an average mole number of the bonded hydroxyalkyl radicals per anhydrous glucose unit in the cellulose of from 0.2 to 1.5 in the case of hydroxybutyl radicals and of 1.5 to 2.5 in the case of hydroxyethyl radicals.

4. The method of claim 1 wherein the monomers are vinyl acetate and ethyl acrylate.

5. The method of claim 1 wherein the monomer is methylacrylate.

6. The method of claim 1 wherein the monomer is chloroprene.

References Cited
UNITED STATES PATENTS

| | | | |
|---|---|---|---|
| 3,296,247 | 1/1967 | Klug | 260—231 |
| 3,442,844 | 5/1969 | Bouchard et al. | 260—17 R X |
| 3,480,602 | 11/1969 | Abercombie et al. | 260—17 R UX |

HAROLD D. ANDERSON, Primary Examiner

L. M. PHYNES, Assistant Examiner

U.S. Cl. X.R.

260—86.1 E, 89.1, 89.5 AW, 91.3 R, 92.3, 231 A